United States Patent
Kolb

(10) Patent No.: US 8,973,967 B2
(45) Date of Patent: Mar. 10, 2015

(54) VEHICLE SEAT, MOTOR VEHICLE AND METHOD FOR SPRING-MOUNTING A VEHICLE SEAT

(75) Inventor: Jens Kolb, Konigstein (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 13/610,435

(22) Filed: Sep. 11, 2012

(65) Prior Publication Data

US 2013/0069409 A1  Mar. 21, 2013

(30) Foreign Application Priority Data

Sep. 15, 2011  (DE) .......................... 10 2011 053 647

(51) Int. Cl.
*B60N 2/50* (2006.01)

(52) U.S. Cl.
CPC ................ *B60N 2/506* (2013.01); *B60N 2/502* (2013.01); *B60N 2/507* (2013.01); *B60N 2/508* (2013.01)
USPC ..................................... 296/65.02; 296/65.05

(58) Field of Classification Search
CPC ........ B60N 2/505; B60N 2/502; B60N 2/507; B60N 2/508
USPC ......................... 296/65.02, 65.05; 297/344.11
See application file for complete search history.

(56) References Cited

U.S. PATENT DOCUMENTS

| | | | |
|---|---|---|---|
| 203,739 A | 5/1878 | Kilburn | |
| 1,544,248 A | 6/1925 | Liebl | |
| 1,607,164 A | 11/1926 | Leipert et al. | |
| 1,945,801 A | 2/1934 | Briggs | |
| 1,948,476 A | 2/1934 | Saurer | |
| 2,489,981 A | 3/1946 | Rose | |
| 2,559,105 A | 7/1951 | Banning, Jr. | |
| 2,607,397 A | 8/1952 | Schneider | |
| 2,682,931 A | 7/1954 | Young | |
| 2,686,667 A | 8/1954 | Willison et al. | |
| 2,933,127 A | 4/1960 | Brewster | |
| 2,982,336 A | 5/1961 | Minici | |
| 3,046,053 A | 7/1962 | Pearlstine | |
| 3,134,568 A | 5/1964 | Carson | |
| 3,208,085 A | 9/1965 | Grimshaw | |
| 3,298,654 A | 1/1967 | Dome | |

(Continued)

FOREIGN PATENT DOCUMENTS

| | | |
|---|---|---|
| DE | 1480465 | 1/1970 |
| DE | 1405350 A1 | 3/1970 |

(Continued)

OTHER PUBLICATIONS

Examination Report prepared by the German Patent Office for Application No. 10 2011 053 647.7 filed Sep. 15, 2011.

(Continued)

*Primary Examiner* — Jason S Morrow
(74) *Attorney, Agent, or Firm* — Sheridan Ross P.C.

(57) ABSTRACT

A vehicle seat having a seat surface, a backrest and a suspension device. The suspension device may comprise at least one upper part on a seat surface side, a lower part on the body side, suspension mechanisms and damping mechanisms. At least the scissor-type frame is positioned between the upper part on the seat surface and the lower part on a vehicle body. The vehicle seat may comprise a tilting mechanism which can be actuated by a vertical deflection of the suspension device for tilting the upper part on the seat surface side relative to the lower part on the body side.

9 Claims, 5 Drawing Sheets

(56) References Cited

U.S. PATENT DOCUMENTS

| | | | |
|---|---|---|---|
| 3,436,042 A | 4/1969 | Van Goubergen | |
| 3,578,376 A | 5/1971 | Hasegawa et al. | |
| 3,608,855 A | 9/1971 | Osenberg | |
| 3,697,128 A | 10/1972 | Strien et al. | |
| 3,724,603 A | 4/1973 | Shiomi et al. | |
| 3,752,432 A | 8/1973 | Lowe | |
| 3,756,556 A | 9/1973 | Georgi | |
| 3,765,676 A | 10/1973 | Bearson et al. | |
| 3,788,697 A | 1/1974 | Barton et al. | |
| 3,802,737 A | 4/1974 | Mertens | |
| 3,826,457 A | 7/1974 | Huot de Longchamp | |
| 3,847,338 A | 11/1974 | Adams | |
| 3,882,956 A | 5/1975 | Plegat | |
| 3,883,172 A * | 5/1975 | Barton et al. | 296/65.02 |
| 3,917,209 A * | 11/1975 | Adams | 248/567 |
| 3,982,718 A | 9/1976 | Folkenroth et al. | |
| 4,002,315 A | 1/1977 | Van Goubergen | |
| 4,022,411 A | 5/1977 | Rumsey | |
| 4,072,287 A | 2/1978 | Swenson et al. | |
| 4,125,242 A | 11/1978 | Meiller et al. | |
| 4,183,492 A | 1/1980 | Meiller | |
| 4,257,626 A | 3/1981 | Adomeit | |
| 4,273,213 A | 6/1981 | Munz | |
| 4,286,765 A | 9/1981 | Delgleize et al. | |
| 4,349,167 A | 9/1982 | Reilly | |
| 4,350,317 A | 9/1982 | Aondetto | |
| 4,440,441 A | 4/1984 | Marrujo et al. | |
| 4,461,444 A | 7/1984 | Grassl et al. | |
| 4,487,383 A | 12/1984 | Mazelsky | |
| 4,500,076 A | 2/1985 | Rova | |
| 4,519,591 A | 5/1985 | Bush et al. | |
| 4,529,158 A | 7/1985 | Sautter, Jr. | |
| 4,678,155 A | 7/1987 | Carter | |
| 4,679,760 A | 7/1987 | Dotzler et al. | |
| 4,685,731 A | 8/1987 | Migut | |
| 4,700,921 A | 10/1987 | Holbrook | |
| 4,714,227 A | 12/1987 | Holm et al. | |
| 4,784,434 A | 11/1988 | Iwami | |
| 4,842,257 A | 6/1989 | Abu-Isa et al. | |
| 4,856,763 A | 8/1989 | Brodersen et al. | |
| 4,859,148 A | 8/1989 | Hibyan | |
| 4,911,381 A | 3/1990 | Cannon et al. | |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A | 5/1991 | Kimura | |
| 5,042,783 A | 8/1991 | Ciolczyk et al. | |
| 5,054,753 A | 10/1991 | Polus | |
| 5,087,503 A | 2/1992 | Meatto | |
| 5,123,625 A | 6/1992 | Spaltofski | |
| 5,127,699 A * | 7/1992 | Maezawa et al. | 296/65.02 |
| 5,194,111 A | 3/1993 | Meatto | |
| 5,211,369 A | 5/1993 | Hoerner | |
| 5,221,071 A | 6/1993 | Hill | |
| 5,222,709 A * | 6/1993 | Culley et al. | 248/421 |
| 5,251,864 A | 10/1993 | Itou | |
| 5,324,095 A | 6/1994 | Yamauchi | |
| 5,331,750 A | 7/1994 | Sasaki et al. | |
| 5,338,090 A | 8/1994 | Simpson et al. | |
| 5,344,210 A | 9/1994 | Marwan et al. | |
| 5,358,210 A | 10/1994 | Simon et al. | |
| 5,368,118 A | 11/1994 | Hoefle | |
| 5,437,494 A | 8/1995 | Beauvais | |
| 5,449,218 A | 9/1995 | Beauvais et al. | |
| 5,531,404 A | 7/1996 | Marechal | |
| 5,553,911 A | 9/1996 | Bodin et al. | |
| 5,555,501 A | 9/1996 | Furihata et al. | |
| 5,632,208 A | 5/1997 | Weber | |
| 5,651,585 A | 7/1997 | Van Duser | |
| 5,657,950 A | 8/1997 | Han et al. | |
| 5,676,424 A | 10/1997 | Winkelhake | |
| 5,730,492 A | 3/1998 | Warrick et al. | |
| 5,743,592 A | 4/1998 | Bedouch | |
| 5,758,859 A | 6/1998 | Gonzalez | |
| 5,871,198 A | 2/1999 | Bostrom et al. | |
| 5,871,257 A | 2/1999 | Dundes, Sr. | |
| 5,899,288 A | 5/1999 | Schubert et al. | |
| 5,967,604 A | 10/1999 | Yoshida | |
| H1833 H | 2/2000 | Hoppel et al. | |
| 6,286,821 B1 | 9/2001 | Schaffer | |
| 6,309,020 B1 | 10/2001 | Niikura et al. | |
| 6,354,556 B1 * | 3/2002 | Ritchie et al. | 248/562 |
| 6,412,864 B1 | 7/2002 | Larson | |
| 6,478,102 B1 | 11/2002 | Puterbaugh et al. | |
| 6,554,359 B2 | 4/2003 | Kohl et al. | |
| 6,582,015 B2 | 6/2003 | Jessup et al. | |
| 6,595,570 B2 | 7/2003 | Susko | |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,857,674 B2 | 2/2005 | Chareyre | |
| 6,935,693 B2 | 8/2005 | Janscha et al. | |
| 7,017,888 B2 | 3/2006 | Platner et al. | |
| 7,044,553 B2 | 5/2006 | Ropp | |
| 7,077,226 B2 | 7/2006 | Oliver et al. | |
| 7,077,227 B2 | 7/2006 | Oliver et al. | |
| 7,080,881 B2 | 7/2006 | Williamson et al. | |
| 7,185,867 B2 | 3/2007 | Hill et al. | |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 | 3/2008 | Ropp | |
| 7,452,019 B1 | 11/2008 | Day | |
| 7,469,861 B2 | 12/2008 | Ferry et al. | |
| 7,478,879 B2 | 1/2009 | Robinson | |
| 7,484,805 B2 | 2/2009 | Baum | |
| 7,568,675 B2 | 8/2009 | Catton | |
| 7,744,149 B2 | 6/2010 | Murray et al. | |
| 7,882,914 B2 | 2/2011 | Scheele et al. | |
| 7,883,135 B2 | 2/2011 | Ravid et al. | |
| 7,886,882 B2 | 2/2011 | Behmenburg et al. | |
| 7,950,726 B2 | 5/2011 | Brown | |
| 7,997,600 B2 | 8/2011 | Haller et al. | |
| 8,061,770 B2 | 11/2011 | Houston et al. | |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,226,163 B1 | 7/2012 | Pearson et al. | |
| 8,261,869 B2 | 9/2012 | Turco et al. | |
| 8,265,832 B2 | 9/2012 | Haller et al. | |
| 8,469,450 B2 | 6/2013 | Wahls et al. | |
| 8,662,588 B1 | 3/2014 | Delmestri | |
| 2002/0033622 A1 | 3/2002 | Jarnail et al. | |
| 2004/0090100 A1 | 5/2004 | Igarashi | |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2008/0164746 A1 | 7/2008 | Dozsa-Farkas | |
| 2008/0197684 A1 | 8/2008 | Ott et al. | |
| 2009/0045000 A1 | 2/2009 | Brown | |
| 2009/0205880 A1 | 8/2009 | Hammonds | |
| 2009/0284061 A1 | 11/2009 | Maier et al. | |
| 2010/0006364 A1 | 1/2010 | Koutsky et al. | |
| 2010/0117428 A1 | 5/2010 | Deml et al. | |
| 2010/0213345 A1 | 8/2010 | Haller | |
| 2010/0276211 A1 | 11/2010 | Kolb et al. | |
| 2010/0289312 A1 | 11/2010 | Burr et al. | |
| 2011/0001342 A1 | 1/2011 | Deml et al. | |
| 2011/0226930 A1 | 9/2011 | Enns et al. | |
| 2011/0233975 A1 | 9/2011 | Mindel et al. | |
| 2011/0278894 A1 | 11/2011 | Lorey | |
| 2012/0007293 A1 | 1/2012 | Bauer et al. | |
| 2012/0025577 A1 | 2/2012 | Kolb | |
| 2012/0032379 A1 | 2/2012 | Kolb | |
| 2012/0043798 A1 | 2/2012 | Haller et al. | |
| 2012/0049602 A1 | 3/2012 | Kaessner | |
| 2012/0091773 A1 | 4/2012 | Lorey | |

(56) References Cited

U.S. PATENT DOCUMENTS

| | | |
|---|---|---|
| 2012/0133184 A1 | 5/2012 | Himmelhuber |
| 2012/0145875 A1 | 6/2012 | Haller et al. |
| 2012/0153551 A1 | 6/2012 | Kolb |

FOREIGN PATENT DOCUMENTS

| | | |
|---|---|---|
| DE | 1480188 A1 | 3/1970 |
| DE | 2309808 | 9/1973 |
| DE | 2317824 | 10/1973 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3003175 | 8/1981 |
| DE | 3208680 | 3/1982 |
| DE | 3237167 | 4/1984 |
| DE | 3517345 | 11/1986 |
| DE | 3890533 T1 | 10/1989 |
| DE | 3901898 | 7/1990 |
| DE | 9312640 | 1/1994 |
| DE | 19907658 | 2/1999 |
| DE | 19744199 | 4/1999 |
| DE | 19919697 | 11/2000 |
| DE | 19945841 | 4/2001 |
| DE | 10129127 A1 | 1/2003 |
| DE | 10206223 | 9/2003 |
| DE | 10300876 | 7/2004 |
| DE | 102005028725 | 1/2005 |
| DE | 102005023088 | 6/2006 |
| DE | 60304643 | 4/2007 |
| DE | 102006030008 | 4/2007 |
| DE | 102008063812 | 4/2007 |
| DE | 12006002984 T5 | 10/2008 |
| DE | 102007027320 | 1/2009 |
| DE | 102008023120 | 5/2010 |
| DE | 102010051326 | 3/2012 |
| EP | 0284365 | 9/1988 |
| EP | 1400398 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 A | 11/2007 |
| WO | WO 92/04224 | 3/1992 |
| WO | WO 92/09451 | 6/1992 |
| WO | WO 98/32627 | 7/1998 |
| WO | WO 03/063650 | 8/2003 |
| WO | WO 2007/058572 | 5/2007 |

OTHER PUBLICATIONS

Official Action with English Translation for China Patent Application No. 201210339857.7, dated Oct. 10, 2014, 14 pages.

* cited by examiner

VEHICLE SEAT, MOTOR VEHICLE AND METHOD FOR SPRING-MOUNTING A VEHICLE SEAT

CROSS REFERENCE TO RELATED APPLICATIONS

This application claims the benefit of German Application No. 10 2011 053 647.7 filed Sep. 15, 2011, the entire disclosure of which is incorporated herein by reference.

The invention relates to a vehicle seat having a seat surface, a backrest and a suspension device comprising at least one upper part on the seat surface side, one lower part on the body side, a scissor-type frame and suspension mechanisms and/or damping mechanisms, at least the scissor-type frame being positioned between the upper part on the seat surface side and the lower part on the body side.

In addition, the invention relates to a motor vehicle, a utility vehicle or an agricultural vehicle having a vehicle seat.

The invention also relates to a method for spring-mounting a vehicle seat in which a suspension device spring-mounts an upper part of the suspension device on the seat surface side with respect to a lower part of the suspension device on the body side.

Generic vehicle seats are sufficiently well known in the prior art and their suspension devices generally offer a very high level of suspension comfort with respect to horizontal excitations acting on a vehicle from external sources and in particular with respect to vertical excitations or similar. However, corresponding excitations on the front and/or rear wheels of the vehicle respectively may often lead to movements in the region of the seat surface which cannot be isolated solely, or at least can be isolated only to an inadequate extent, by an orthogonal suspension system based on suspension mechanisms which work solely in vertical and horizontal directions. Excitations on the front wheels, which can be taken up predominantly by a corresponding longitudinal horizontal suspension mechanism of the suspension device, play a less important role than excitations which are passed into the body of the vehicle from the rear wheels. However, excitations resulting from the rear wheels are only partly absorbed by the longitudinal horizontal suspension mechanism and thus also put weight onto a vertical suspension mechanism of the suspension device. In particular in the case of a greater rear wheel excitation, this often leads to the problem that a necessary longitudinal horizontal spring deflection cannot be provided to a sufficient extent by the longitudinal horizontal suspension mechanism. In particular in the event of a horizontal longitudinal excitation which also acts on the vehicle, an existing longitudinal horizontal spring deflection path is used up prematurely with the result that the longitudinal horizontal suspension mechanism comes into contact with its limit, thus impairing seat comfort to a significant extent. Such additional horizontal longitudinal excitation acting on the vehicle may, for example, be initiated by impacts from accessory equipment or trailers. Furthermore, a rear wheel vertical excitation in particular also generates an angular momentum on the vehicle seat, as this is often positioned very high and is not usually perpendicular to this vertical excitation.

The object of the present invention is to improve generic vehicle seats so as in particular to resolve the above-described disadvantages.

The object of the invention is achieved by a vehicle seat having a seat surface, a backrest and a suspension device comprising at least one upper part on the seat surface side, one lower part on the body side, a scissor-type frame and suspension mechanisms and/or damping mechanisms, at least the scissor-type frame being positioned between the upper part on the seat surface side and the lower part on the body side, and the vehicle seat, according to the invention, comprising a tilting mechanism which can be actuated by a vertical deflection of the suspension device to tilt the upper part on the seat surface side relative to the lower part on the body side.

Such a tilting mechanism advantageously makes it extremely easy, by design means, to provide a longitudinal horizontal spring deflection in addition to the vehicle seat's existing longitudinal horizontal suspension mechanism or, alternatively, instead of an existing longitudinal horizontal suspension mechanism on the vehicle seat.

An additional longitudinal horizontal spring deflection can thus be provided where a longitudinal horizontal suspension mechanism is already present. Or, alternatively, the tilting mechanism can also be provided instead of a traditional longitudinal horizontal suspension mechanism operating in a translational motion, with the result that the vehicle seat suspension device only needs to comprise an additional vertical suspension mechanism, thus simplifying the design of the suspension device to a not inconsiderable extent.

Preferably, the present vehicle seat is a driver's seat in a utility vehicle used primarily for agricultural purposes which is accordingly exposed to high loads based on external influences such as extremely uneven road surfaces over difficult terrain.

The object of the invention may thus also be achieved by a motor vehicle, a utility vehicle or an agricultural vehicle having a vehicle seat which comprises at least one of the features described here. The safety of such a vehicle can, in particular, be significantly increased in this case as the driver is seated more comfortably and safely and is thus much better able to concentrate on driving situations.

In accordance with the invention, the term "tilting mechanism" describes any mechanisms which comprise an appropriate means of moving the upper part on the seat surface side in rotation relative to the lower part on the body side.

Accordingly, a preferred alternative embodiment also provides that the upper part on the seat surface side comprises a point of rotation located outside the suspension device, this point of rotation being positioned such that the upper part on the seat surface side can be rotated about it when the suspension device is deflected vertically.

In this case, the point of rotation is advantageously located on or in the vicinity of a geometric connecting line between two ground contact areas of two front wheels of a vehicle comprising the vehicle seat according to the invention, with the result that the upper part on the seat surface side is able to rotate substantially about the contact areas of the front wheels.

In addition, it is advantageous if the upper part on the seat surface side is mounted such that it can be positioned at different angles to the lower part on the body side by means of the suspension device.

This requires that the upper part on the seat surface side is mounted such that it can be pivoted relative to the lower part on the body side.

The object of the invention is also achieved by a method for spring-mounting a vehicle seat in which a suspension device spring-mounts an upper part of the suspension device on the seat surface side with respect to a lower part of the suspension device on the body side and in which the upper part on the seat surface side is deflected at an angle to the lower part on the body side when the suspension device is deflected vertically.

By rotating the upper part of the suspension device on the seat surface side relative to the lower part of the suspension device on the body side, an alternative or cumulative longitudinal horizontal spring deflection can be advantageously provided by design means.

The suspension device according to the invention is thus characterised by a corresponding rotational component. A further alternative embodiment is therefore equipped particularly advantageously if the suspension device comprises at least one vertical suspension mechanism and one rotational suspension mechanism which is positioned such that it can be actuated as a function of the vertical suspension mechanism.

A suspension device for providing a longitudinal horizontal spring deflection is also advantageous, this differing from a longitudinal horizontal suspension mechanism which operates in a translational motion, as this makes alternative suspension device designs possible.

A further preferred embodiment provides a rotational suspension mechanism for generating a longitudinal horizontal offset, in particular with respect to the upper part on the seat surface side relative to the lower part on the body side, this being proportional to a vertical spring deflection. As a result, it is possible to construct a mechanically very effective suspension device in a very constrained construction area.

It is particularly advantageous if the rotational suspension mechanism moves the upper part on the seat surface side, in particular, with a longitudinal horizontal offset which acts in proportion to a vertical spring deflection of the rotational suspension mechanism.

An extremely advantageous embodiment provides that the upper part on the seat surface side incorporates different spring deflections in passing from its front side to its rear side relative to the lower part on the body side. These different spring deflections mean that it is particularly simple, by design means, to position the upper part on the seat surface side in the desired manner at an angle to the lower part on the body side.

It is evident that the tilting mechanism and in particular the suspension device for the purpose of creating such a tilting mechanism can be created by means of different designs.

In accordance with a further aspect of the invention, it is thus advantageous if the suspension device comprises an asymmetric oscillation mechanism. This tilting mechanism can be produced effectively and at reasonable cost by means of the asymmetric oscillation mechanism.

It is evident that, in practice, an appropriate oscillation mechanism can be implemented by a variety of means.

The tilting mechanism or the rotational suspension mechanism and, in particular, the oscillation mechanism according to the invention can be designed particularly simply by structural means if the suspension device comprises a lever assembly with at least one first lever mechanism and one second lever mechanism in which both lever mechanisms have different lengths.

Preferably the first lever mechanism is 270 mm long and the second lever mechanism is 285 mm long. Such a lever length ratio between a first lever mechanism and a second lever mechanism guarantees particularly good seat surface control as described with specific reference to the embodiment shown in FIGS. 9 and 10.

In the simplest case, such a lever mechanism incorporates, in each case, one lever arm component. However, to enable corresponding kinematics to be designed more advantageously, it is extremely expedient if at least one of the lever mechanisms comprises more than one lever arm component.

The lever arm component may be provided, for example, in the form of a lever rod or a lever tube. Profiled sections are particularly advantageous as they usually make it possible to achieve improved strength values combined with good weight values.

The lever assembly with different lengths of lever arm components may advantageously be designed in the same way as a hinge with four or more joints, thus, in particular, providing a simple structural means of avoiding the upper part on the seat surface side and the lower part on the body side working in parallel.

In particular, to pass large-scale excitations to the suspension device in a manner which is at least slightly damped, it is very favourable to provide an elastomeric bearing mechanism in the vicinity of the lower part on the body side. One of the swivel joints should ideally be designed as an elastomeric bearing mechanism. A front upper bearing of the vertical suspension mechanism should preferably be designed as an elastomeric bearing mechanism. A rear upper bearing of the vertical suspension mechanism may also advantageously be designed as a vertical swivel bearing.

On the one hand, pitching of a vehicle cab can be isolated in particular by the last-mentioned measures. Buffeting of the backrest can also be reduced.

If, for example, a pneumatic spring is also fitted between the second or rear lever mechanism and the vehicle body respectively, this provides a vehicle seat with particularly good vertical suspension.

It is thus advantageous if the suspension device comprises an additional longitudinal horizontal suspension mechanism and/or a transverse horizontal suspension mechanism. This can also lead to a further increase in comfort.

Additional benefits, aims and properties of the present invention will be described with the aid of the attached drawings and the subsequent description, in which a vehicle seat equipped with a tilting mechanism which can be actuated by means of a vertical deflection of a suspension device and its mode of operation according to the invention are presented and described by way of example. Components which correspond at least substantially with regard to their function in the individual figures may be identified by like reference numerals in these figures, although for the sake of clarity these components do not need to be numbered and described in all figures. The drawings are as follows:

Figure 1:
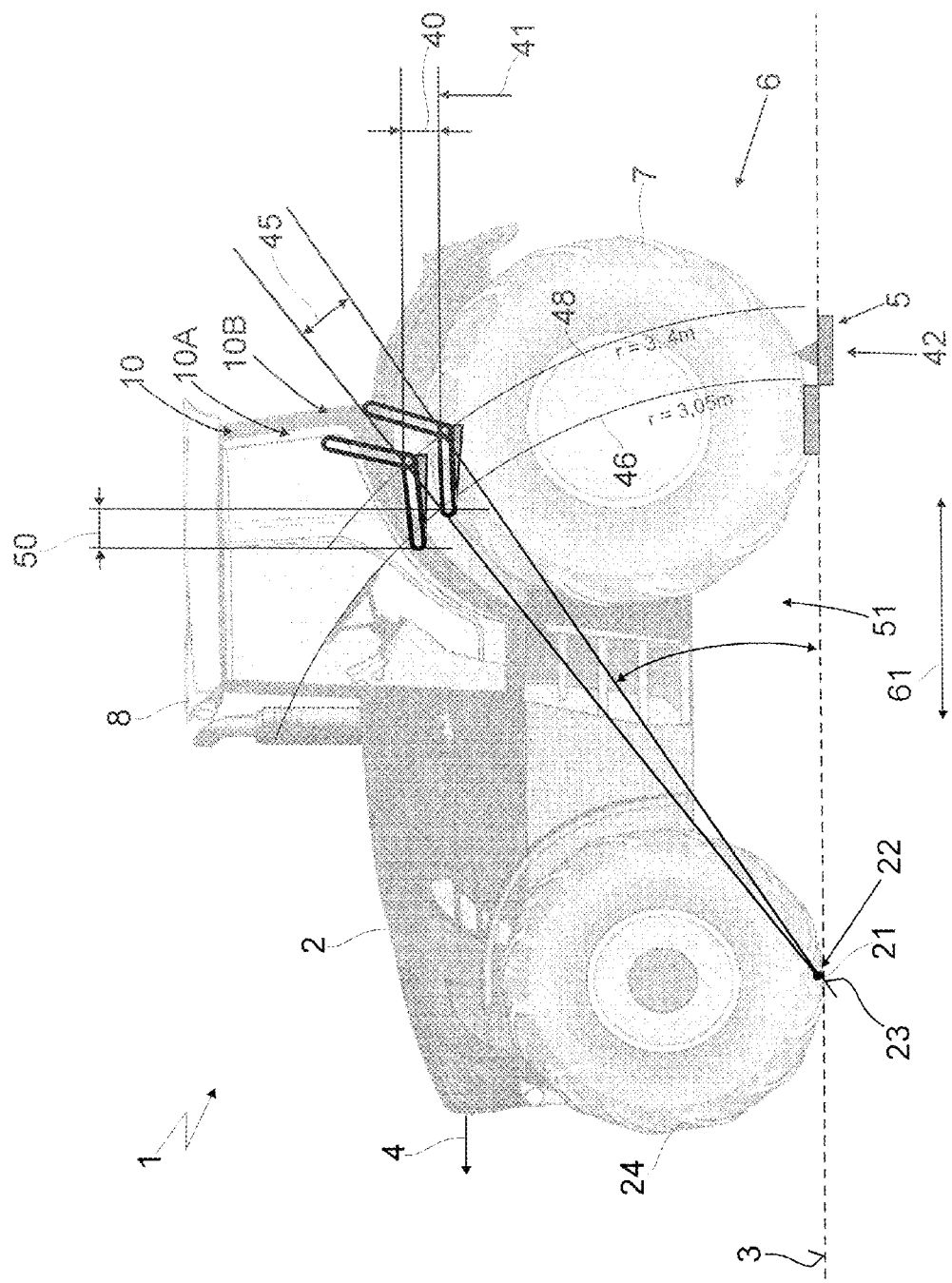
FIG. 1 is a schematic side view of a utility vehicle with a vehicle seat comprising a tilting mechanism which can be actuated by means of a vertical deflection of a suspension device for tilting an upper part on the seat surface side with respect to a lower part on the body side.

The utility vehicle 1 shown in FIG. 1 is a tractor 2 for use specifically in agricultural enterprises. It is evident that the tractor 2 often has to move over difficult terrain with rough ground 3 in the direction of travel 4 and is exposed to extreme deflections in this process, although for the sake of clarity only a vertical deflection 5 on the rear wheels is illustrated schematically in this embodiment, only the left rear wheel 7 of these wheels being shown. In the vehicle cab 8 of the tractor 2, a vehicle seat 10 is installed, this seat being shown deflected in an upper position 10A and a lower position 10B in the illustration in FIG. 1. In this case, the upper position 10A identifies a vehicle seat 10 at its highest position with maximum release. On the other hand, the lower position 10B identifies a vehicle seat 10 at its lowest position with maximum compression. Amongst other things, the vehicle seat 10 comprises a seat surface 12, a backrest 13 and a suspension device 14. The suspension device 14 in particular is shown in alternative embodiments in FIGS. 5 to 10.

Figure 10:
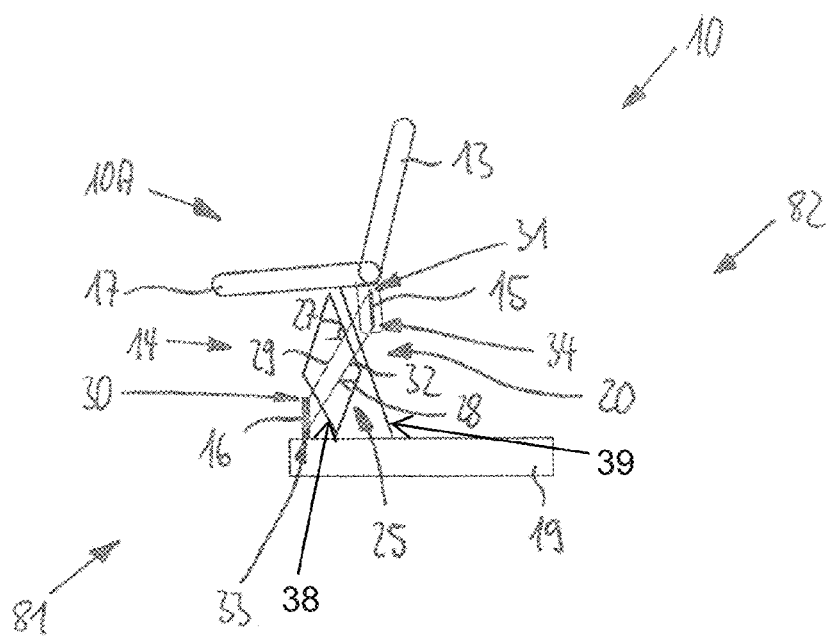
FIG. 10 is a schematic view of the vehicle seat from FIGS. 1 to 9 in a suspension position with maximum deflection.

In this case, the suspension device 14, as also shown in FIG. 10 in particular, comprises at least one upper part 15 positioned on the seat surface side, a lower part 16 on the body side and a scissor-type frame 38, which is not illustrated here in FIG. 1 but is illustrated in FIG. 10, plus suspension mechanisms and damping mechanisms 39, which are likewise not shown explicitly in FIG. 1 for the sake of clarity. The suspension mechanisms comprise both a longitudinal horizontal suspension mechanism operating in a translational motion and a transverse horizontal suspension mechanism operating in a translational motion, and a vertical suspension mechanism also operating in a translational motion. In this case the damping mechanisms comprise corresponding horizontal and vertical damping mechanisms. In addition to the scissor-type frame, the suspension and damping mechanisms are positioned substantially between the upper part 15 on the seat surface side and the lower part 16 on the body side. In this case the upper part 15 of the suspension device 14 on the seat surface side is assigned to a seat part 17 of the vehicle seat 10, whilst the lower part 16 on the body side is positioned on a body part 18, such as a bracket 19 of the tractor 2.

The suspension device 14 advantageously also comprises a tilting mechanism 20 for tilting the upper part 15 on the seat surface side relative to the lower part 16 on the body side about a point of rotation 21 which is positioned in a region 22 of the contact surface 23, or more precisely in a region of a geometric connecting line (not numbered explicitly here) between front wheels 24 and the ground 3.

The suspension device 14 comprises an asymmetric oscillation mechanism 25 to create the tilting mechanism 20, this oscillation mechanism comprising a lever assembly 26 with a first shorter lever mechanism 27 and a second longer lever mechanism 28.

In the most simple case, the first shorter lever mechanism 27 may consist of an individual lever rod 29 which is mounted in a lower swivel joint 30 on the body part 18 and in an upper swivel joint 31 on the seat part 17 such that it can be moved in rotation. The second longer lever mechanism 28 may also consist of a further individual lever rod 32 which is mounted in a further lower swivel joint 33 on the body part 18 and in a further upper swivel joint 34 on the seat part 17 such that it can be moved in rotation.

Ideally, the upper swivel joint 31 is also positioned higher than the further upper swivel joint 34 in the suspension device 14, resulting in diagonal offsetting of the bearing positions (not numbered explicitly here) to form a wedge shape 35 with respect to the two upper swivel joints 31 and 34. In this case the corresponding points of rotation (not numbered explicitly here) are transformed by means of the upper swivel joints 31 and 34 in(to) the region of a fixing area of the vehicle seat 10.

With reference to the first embodiment 36 as shown in FIGS. 1 to 4 it is assumed that the suspension device 14 displays a vertical spring deflection 40 of 180 mm and the seat surface 12 is positioned at a height 41 of h=1800 mm above the ground 3 in its compressed state. Excitation of the vertical deflection 5 at the rear wheels 6 takes place over a circular path 42 about the front wheels 24. Given the assumed height 41 and a radius of $r_v$=3.05 m, which corresponds to the wheelbase of the tractor 2, the angular position amounts to $\alpha$=36.17° where h=r·sin α, the vehicle seat 10 being compressed in position 10B in this case. In the released position, which corresponds to position 10A, the overall height (not numbered explicitly here) is h'=1800 mm+18 mm=1980 mm, leading to a new angular position $\alpha'$=40.48° with h'=r·sin α'. A rotation 45 of approx. 4.5° (rounded) thus takes place synchronously with respect to the overall vertical spring deflection 40.

Figures 2, 3:
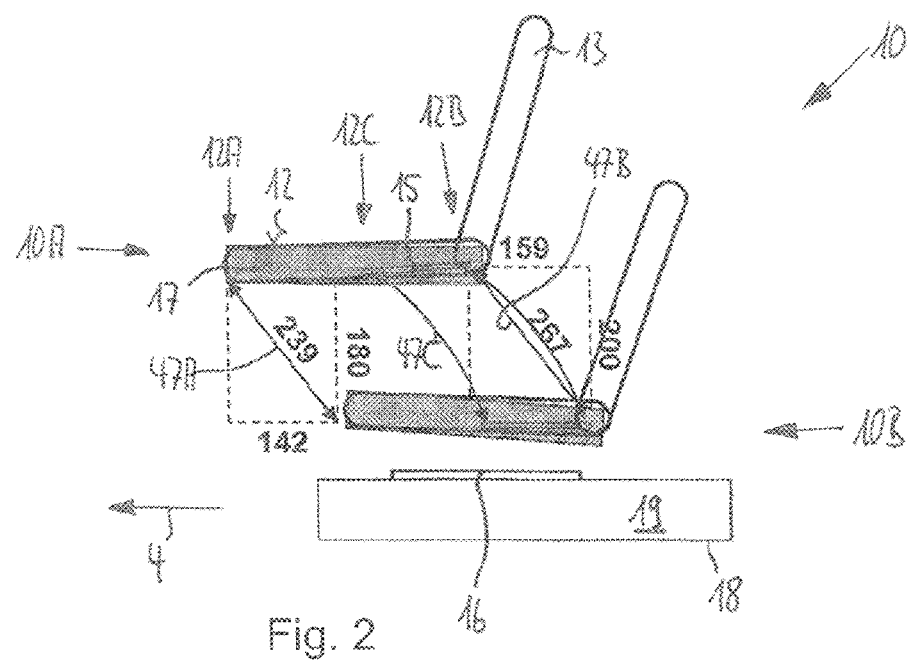
FIG. 2 is a schematic view of the vehicle seat from FIG. 1 with the specified absolute spring deflections.
FIG. 3 is a further schematic view of the vehicle seat from FIGS. 1 and 2 with the resulting offsets in length and height from a compressed position to a released position.

As can be seen very clearly from the illustration in FIG. 2, this rotation 45 over a front arc 46 with respect to the upper swivel joint 31 leads to a continuous front spring deflection 47A with $b_v$=239 mm where π·a·r/180°=π·4.5°·3.05/180° in a front seat region 12A of the seat surface 12. Accordingly, a continuous rear spring deflection 47B with $b_h$=267 mm where π·α·r/180°=π·4.5°·3.4/180° in a rear seat region 12A of the seat surface 12 is obtained over a rear arc 48 with a radius $r_h$=3.4 mm with respect to the further upper swivel joint 34. A continuous middle spring deflection 47C with $b_m$=255 mm where π·α·r/180°=π·4.5°·3.25/180° is obtained with regard to a middle seat region 12C of the seat surface 12 over an intermediate arc (not numbered explicitly here).

Overall, a longitudinal horizontal spring deflection 50 can advantageously be achieved solely by means of the tilting mechanism 20 operating in such a way, without having to use a longitudinal horizontal suspension mechanism (not illustrated here) operating in a translational motion. A longitudinal horizontal suspension mechanism operating in a translational motion may however also be present to extend the longitudinal horizontal spring deflection 50. An advantageous rotational suspension mechanism 51 can thus be created by means of the kinematics on the vehicle seat 10 described here.

In detail the following offsets emerge in terms of height and length from the compressed position—upper position 10A—to the released position—lower position 10B—and these are also shown graphically with reference to FIGS. 2 and 3 in particular.

$$dh_v=|r_v·\sin-r_v·\sin'|=|1.8-1.98|=180 \text{ mm}; dl_v=|r_v·\cos-r_v·\cos'|=|2.4622-2.32|=142 \text{ mm}; dh_h=|r_h·\sin-r_h·\sin'|=|2.0066-2.2072|=200 \text{ mm}; dl_h=|r_h·\cos-r_h·\cos'|=|2.7447-2.5862|=159 \text{ mm}$$

Figure 4:
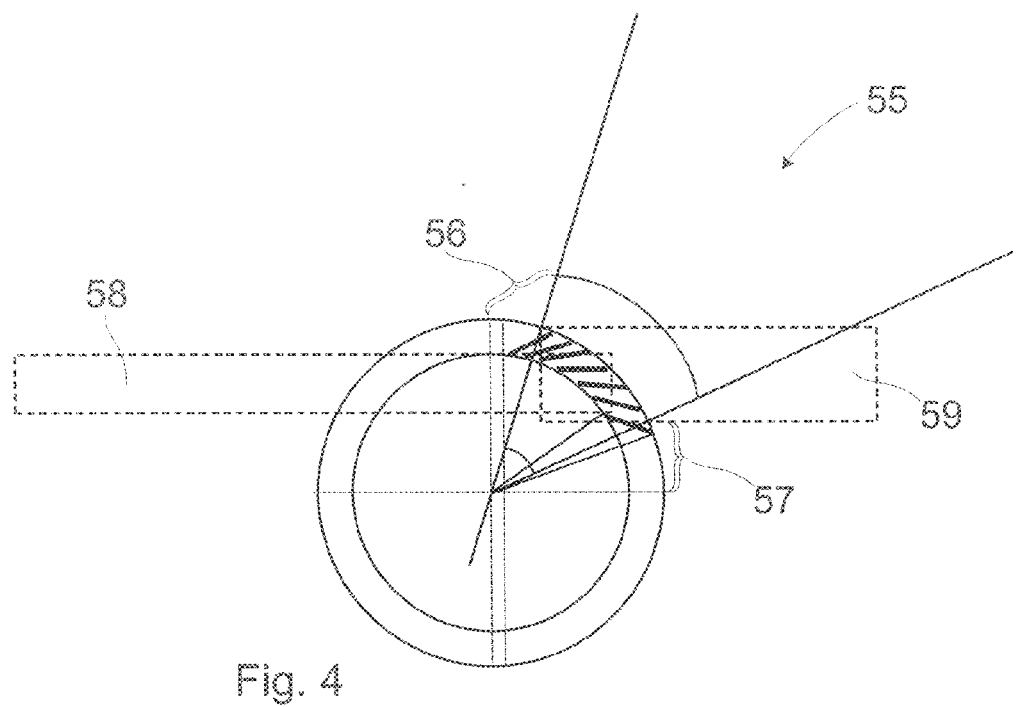
FIG. 4 is a schematic view of angled regions with regard to a design of a rear lever mechanism.
Figure 5:
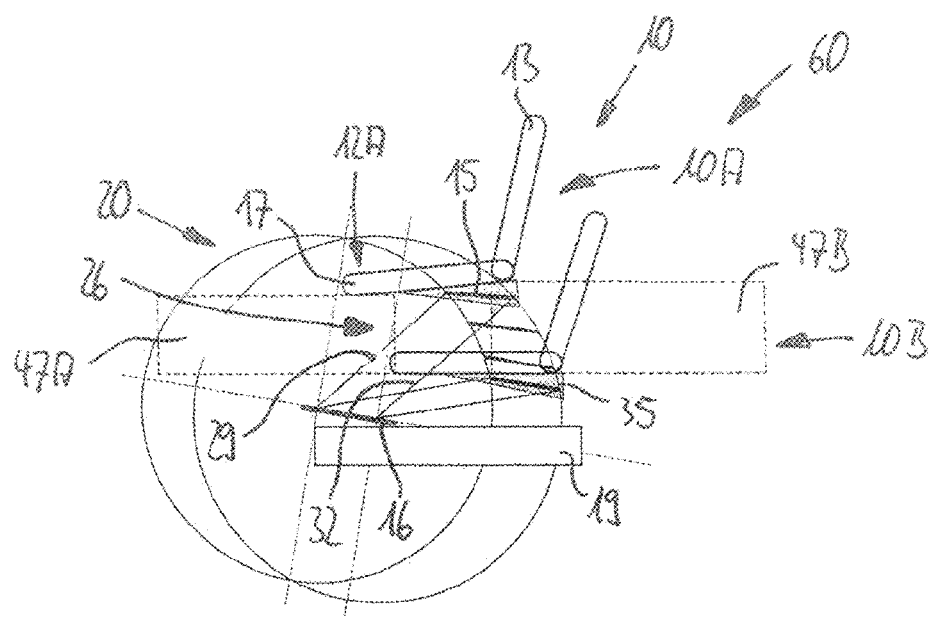
FIG. 5 is a schematic view of a first spring deflection path of the vehicle seat from FIGS. 1 to 4.

The illustration 55 shown in FIG. 4 depicts angular ranges with respect to a circular path of a design of the second lever mechanism 28. The illustration 55 clearly shows that an angular range 56 between 0° and 20° and an angular range 57 between 70° and 90° should be avoided wherever possible, as the motion in the x and y directions is disproportional in these angular ranges 56, 57. In this case the front area 58 identifies a front vertical spring deflection and the rear area 59 identifies a rear vertical spring deflection. This leads to:

Lever height·sin α−lever height·sin 20=210 mm; lever height·cos 20°−lever height·cos α=165 mm; lever height·(sin 70°−sin 20°)=210; lever height=210/0.6=351.4 mm Motion on the circle segment with a smaller lever height: s=267 mm over an angular range of approx. 40°; $S=2 \cdot r \cdot \sin \alpha/2$; $r=s/(2 \cdot \sin \alpha/2)$;
resulting in: $r_h=390$ mm and $r_m=372$ mm With lever mechanisms 27 and 28 which are approximately ⅔ shorter as per the illustration 60 in FIG. 5, the course of the upper swivel joints 31 and 34 admittedly covers a narrower curved path, but the front seat region 12A can thus be offset slightly forward overall, with the result that the bracket 19 remains below the vehicle seat 10 in the overall movement of the vehicle seat 10 with respect to the front spring deflection 47A with a value of 180 mm and the rear spring deflection 47B with a value of 210 mm. The fact that the lever rods 29 and 32 are not the same length means that the spring deflection describes a circular path which can be adapted to the respective excitation of the vehicle by the lengths and arrangement on the lower part 16 on the body side or on the upper part 15 on the seat surface side. It is advantageous if the bearing positions are offset diagonally, see wedge 35, to project the dead point of the rotational motion from the spring deflection in the compressed position 10B. In the dead point, the vehicle seat 10 does not know whether it is supposed to rotate right or left. The overall spring deflection path is force-guided by means of the lever assembly 26 with its fixed points of rotation of swivel joints 30, 31, 33 and 34 with respect to the upper part 15 on the seat surface side and the lower part 16 on the body side. In compression, the vehicle seat 10 with a small inclination backwards—clockwise rotation—also moves some distance backwards. The longitudinal horizontal suspension mechanism is released by the backwards movement. This is thus advantageously and ideally available to fulfil its actual purpose to the full extent. An additional spring deflection towards the longitudinal vehicle axis 61 (see FIG. 1) is, for example, used to reduce impacts from accessory equipment or trailers respectively and to compensate for longitudinal excitations which cannot be adequately reduced by synchronous movement of the vertical suspension. This is, for example, the case if the lever assembly 26 has not been sufficiently well adjusted to the respective vehicle.

Figure 6:
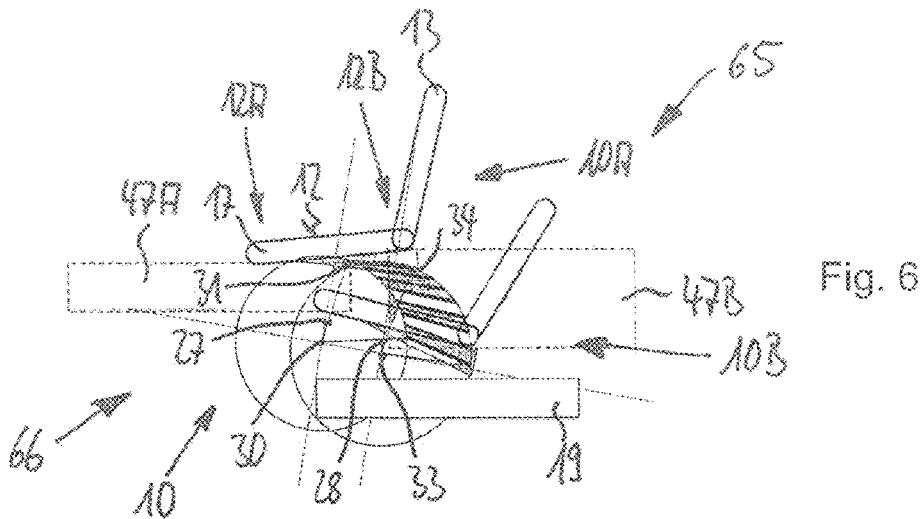
FIG. 6 is a schematic view of a second spring deflection path of the vehicle seat from FIGS. 1 to 5.

The illustration 65 in FIG. 6 shows a different embodiment 66 in which the original lengths of the lever mechanisms 27 and 28 are halved and the upper swivel joints 31, 34 are spaced apart by 150 mm and the lower swivel joints 30 and 33 are spaced apart by 128 mm from each other. As a result, the vehicle seat 10 moves more in rotation than in the vertical suspension, but the bracket 19 still remains beneath the vehicle seat 10 and does not protrude critically during compression. A front spring deflection 47A of 106 mm and a rear spring deflection of 210 mm can be achieved in this process.

Figure 7:
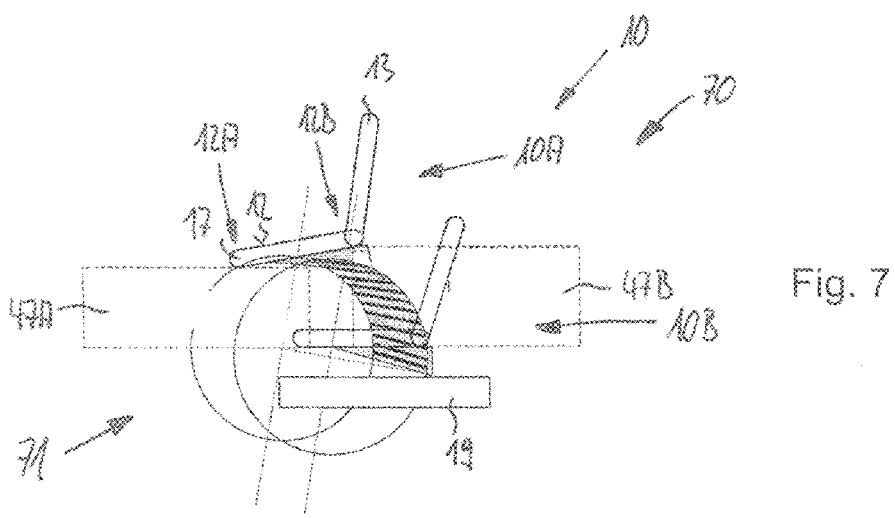
FIG. 7 is a schematic view of a third spring deflection path of the vehicle seat from FIGS. 1 to 6.

In the additional illustration 70 shown in FIG. 7, in this selected embodiment 71 with lever mechanisms 27 and 28 (not shown here) which are ⅔ as long, the upper swivel joints 31, 34 (not shown here) are spaced apart by 132 mm and the lower swivel joints 30 and 33 (not shown here) are spaced apart by 150 mm from each other, with the result that the vehicle seat 10 still rotates heavily and the bracket 19 protrudes at the bottom during compression. A front spring deflection 47A of 212 mm and a rear spring deflection 47B of 262 mm can be achieved in this process.

Figure 8:
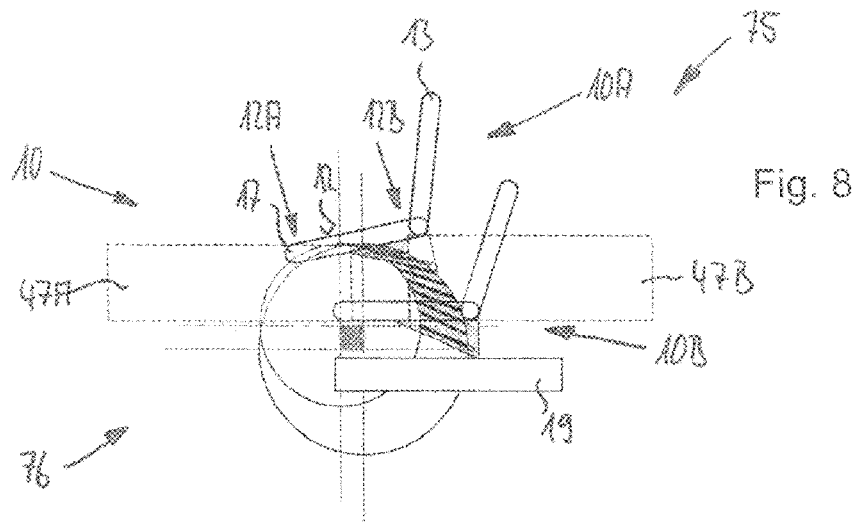
FIG. 8 is a schematic view of a fourth spring deflection path of the vehicle seat from FIGS. 1 to 7.

In the additional embodiment 76 shown in the illustration 75 in FIG. 8, the front lever mechanism 27 (not shown here) is further shortened with respect to the embodiment shown in illustration 70 in FIG. 7, with the result that the bracket still remains hidden by the vehicle seat 10 in the compressed lower position 10B, but the vehicle seat 10 rotates even more than before. In this embodiment 76, a front spring deflection 47A of 188 mm and a rear spring deflection 47B of 210 mm can be achieved.

Figure 9:
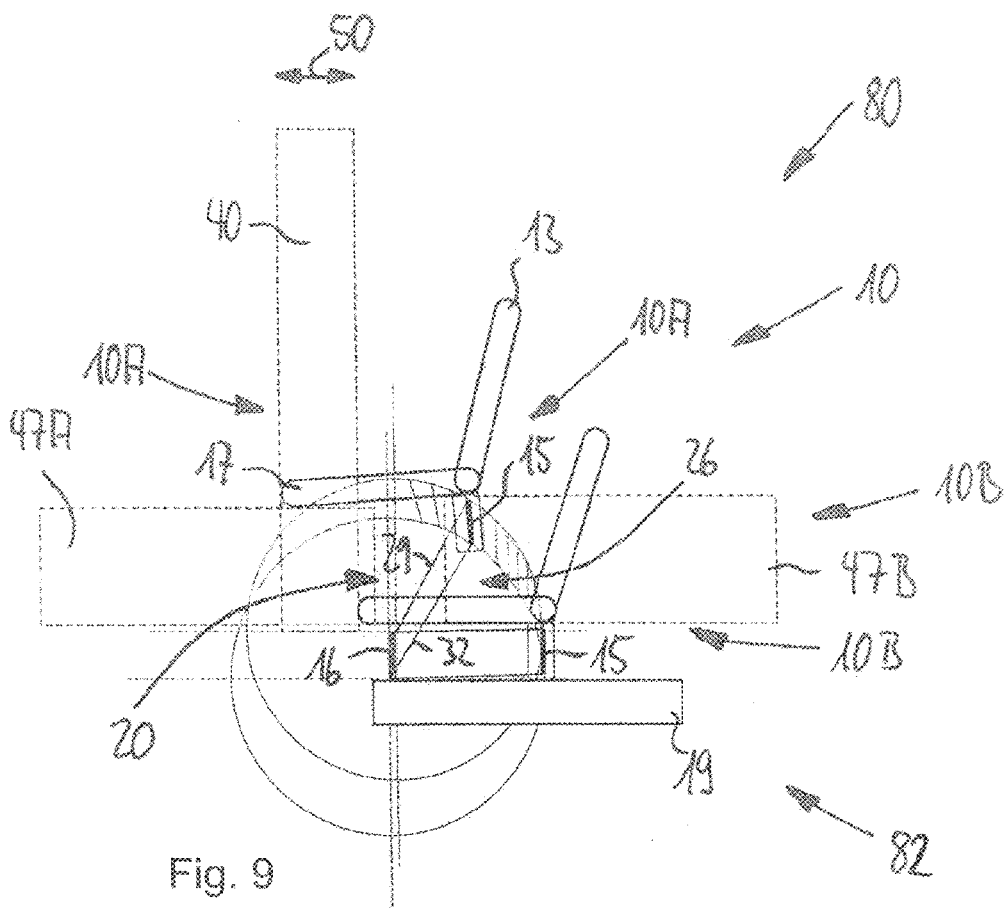
FIG. 9 is a schematic view of an optimum spring deflection path of the vehicle seat from FIGS. 1 to 8.

The illustrations 80 or 81 respectively in FIGS. 9 and 10 show an optimised embodiment 82 of the lever assembly 26, in which the two lever mechanisms 27 and 28 are extended again, so as to provide adequately long deflection paths, closer to each other, of 212 mm in the case of 47A and 226 mm in the case of 47B. In this case the lever rod 29 is 270 mm long and the additional lever rod 32 is 285 mm long. In addition, the point of rotation of the lever rod 29 is located 86 mm higher and 14 mm to the rear with respect to the point of rotation of the additional lever rod 32. This leads to a rotation 45 with a value of 5°, permitting a longitudinal horizontal spring deflection 50 with a value of 139 mm, which means that a vertical spring deflection 40 with a value of 210 mm can be achieved. The bracket 19 thus advantageously remains beneath the seat part 17 in the compressed lower position 10B.

The vehicle seat 10 from FIG. 9 shown again in FIG. 10 is in a released upper position 10A and is depicted without additional graphics. In this case it is clear that both the lower part 16 on the body side and the upper part 15 on the seat surface side are incorporated in a more or less upright position in the suspension device 14, with the result that the lower swivel joint 30 and the additional lower swivel joint 33 and the upper swivel joint 31 and the additional upper swivel joint 34 are aligned with each other in their respective vertical positions.

Further opportunities for optimisation can be achieved by moving the points of rotation with respect to the lower swivel joints 30 and 33 into the bracket 19 so that it is not just the vertical suspension which acts on the lower spring deflection.

It is evident that the examples explained above are merely initial embodiments of the vehicle seat according to the invention. The embodiment of the invention is thus not restricted to these examples or forms respectively.

All features disclosed in the application documents are claimed as essential to the invention in the sense that they are new compared with the prior art, either individually or in combination.

LIST OF REFERENCE SIGNS

1 Utility vehicle
2 Tractor
3 Ground
4 Direction of travel
5 Vertical deflection
6 Rear wheels
7 Left rear wheel
8 Vehicle cab
10 Vehicle seat
10A Upper position
10B Lower position
12 Seat surface
12A Front seat region
12B Rear seat region
12C Middle seat region
13 Backrest
14 Suspension device
15 Upper part on the seat surface side
16 Lower part on the body side
17 Seat part
18 Body part
19 Bracket
20 Tilting mechanism
21 Point of rotation
22 Region
23 Contact surface 24 Front wheels
25 Asymmetric oscillation mechanism
26 Lever assembly
27 First shorter lever mechanism
28 Second longer lever mechanism
29 Lever rod
30 Lower swivel joint
31 Upper swivel joint
32 Additional lever rod
33 Additional lower swivel joint
34 Additional upper swivel joint
35 Wedge
36 First example
40 Vertical spring deflection
41 Height
42 Circular path
45 Rotation
46 Front arc
47A Front spring deflection
47B Rear spring deflection
47C Middle spring deflection
48 Rear arc
50 Longitudinal horizontal spring deflection
51 Rotational suspension mechanism
55 Illustration
56 Angular range
57 Angular range
58 Front area
59 Rear area
60 Illustration
61 Longitudinal vehicle axis
65 Illustration
66 Different embodiment
70 Illustration
71 Embodiment
75 Illustration
76 Additional embodiment
80 Illustration
81 Illustration
82 Optimised embodiment

The invention claimed is:

1. A vehicle seat having a seat surface, a backrest and a suspension device, the suspension device comprising at least one upper part on the seat surface side, one lower part on a body side, a suspension mechanism, a damping mechanism and a tilting mechanism, each of the damping mechanism, suspension mechanism and tilting mechanism being positioned between the upper part on the seat surface side and the lower part on the body side, wherein the suspension device comprises a lever assembly comprising a first lever mechanism and a second lever mechanism vertically offset from one another, wherein the tilting mechanism is configured to actuate by means of a vertical deflection of the suspension device for tilting the upper part on the seat surface side relative to the lower part on the body side, wherein the first lever mechanism consists of an individual lever rod mounted in a lower swivel joint on the lower part on the body side and an upper swivel joint on the upper part on the seat surface side such that it can be moved in rotation.

2. The vehicle seat according to claim 1, wherein the upper part on the seat surface side comprises a point of rotation positioned outside the suspension device, about which the upper part on the seat surface side is positioned such that it can rotate during vertical deflection of the suspension device.

3. The vehicle seat according to claim 1, characterized by a rotational suspension mechanism for producing a longitudinal horizontal offset in particular regarding the upper part on the seat surface side with respect to the lower part on the body side, which is proportional to a vertical spring deflection.

4. The vehicle seat according to claim 1, wherein the two lever mechanisms have different lengths, and at least one of the lever mechanisms comprises more than one lever arm component.

5. The vehicle seat according to claim 1, wherein the upper part on the seat surface side is mounted such that it can be positioned at different angles with respect to the lower part on the body side by means of the suspension device.

6. The vehicle seat according to claim 1, wherein the upper part on the seat surface side has different spring deflections in passing from its front side to its rear side relative to the lower part on the body side.

7. The vehicle seat according to claim 4, wherein the first lever mechanism is shorter than the second lever mechanism.

8. The vehicle seat according to claim 1, wherein the suspension device comprises at least one vertical suspension mechanism and one rotational suspension mechanism for producing a longitudinal horizontal spring deflection which is positioned such that it can be actuated as a function of the vertical suspension mechanism.

9. A motor vehicle, utility vehicle or agricultural vehicle having a vehicle seat characterized by a vehicle seat according to claim 1.

* * * * *